United States Patent [19]

Sarkisian et al.

[11] Patent Number: 4,964,557
[45] Date of Patent: Oct. 23, 1990

[54] BIDIRECTIONAL WEB GUIDING SYSTEM

[75] Inventors: Nancy L. Sarkisian, Pasadena; Stanley W. Martin, Temple City, both of Calif.

[73] Assignee: Datatape Incorporated, Pasadena, Calif.

[21] Appl. No.: 345,378

[22] Filed: Apr. 28, 1989

[51] Int. Cl.$^5$ .......................................... B65H 26/00
[52] U.S. Cl. ..................... 226/18; 242/57.1; 226/21
[58] Field of Search ................... 226/18, 19, 20, 21, 226/22, 3, 196; 242/57.1, 186

[56] References Cited

U.S. PATENT DOCUMENTS

| | | | |
|---|---|---|---|
| 2,542,590 | 2/1951 | Stone | 242/186 X |
| 2,940,752 | 6/1960 | Deeken . | |
| 3,326,435 | 6/1967 | Shelton . | |
| 3,380,637 | 4/1968 | Knepp | 226/20 |
| 3,444,445 | 5/1969 | Mullin | 242/186 X |
| 3,606,198 | 9/1971 | Gilbreath et al. | 242/186 |
| 3,697,676 | 10/1972 | Protas | 178/6.6 P |
| 3,786,974 | 1/1974 | Kron | 226/19 |
| 4,212,422 | 7/1980 | Rauchfuss et al. | 226/196 |
| 4,291,825 | 9/1981 | Glanz | 226/18 |
| 4,363,042 | 12/1982 | Kimura et al. | 360/71 |
| 4,453,659 | 6/1984 | Torpey | 226/20 |
| 4,582,235 | 4/1986 | Schulz | 226/20 |
| 4,816,844 | 3/1984 | Uchida et al. | 242/57.1 X |

FOREIGN PATENT DOCUMENTS 63-43173 2/1988 Japan .

Primary Examiner—Joseph J. Hail, III
Assistant Examiner—Paul T. Bowen
Attorney, Agent, or Firm—William F. Noval

[57] ABSTRACT

Disclosed is a system for bidirectionally guiding web, such as tape in magnetic tape recording/reproducing apparatus. The system eliminates the necessity for edge guides, reduces stresses in web resulting in longer web life, and effects accurate tracking of the web as it is transported in opposite directions. The system includes a plurality of edgeless cylindrical guide rollers mounted on members which are pivoted together. The system includes a plurality of edge sensors and linear servo motors. The edge sensors measure the web edge position and the linear servo motors control the amount of rotation about a pivotal axis which coincides with the center line of a span of web. In this way, web edge position is controlled without any frictional sliding contact between the web and guiding rollers and without the use of edge guides which damage the web edge.

5 Claims, 4 Drawing Sheets

BIDIRECTIONAL WEB GUIDING SYSTEM

SUMMARY OF THE INVENTION

This invention relates in general to web guiding systems and, more particularly, this invention relates to a system for guiding magnetic tape in magnetic tape recording/reproducing apparatus.

Magnetic tape recording/reproducing apparatus are widely used to record analog or digital information on tracks on magnetic tape. Generally, the magnetic tape is transported, past a magnetic head assembly, between a pair of reels. Typically, the magnetic head assembly may include a band of stationary magnetic heads which record and reproduce information on a plurality of tracks which extend longitudinally of the tape, parallel to the direction of tape transport. More recently, rotary head magnetic head assemblies include rotary heads which record and reproduce information in slant tracks at an angle on the tape. In either case, it is essential that the magnetic tape is guided past the magnetic head assembly at a precise location, so that there is no degradation of information during recording and reproducing. Thus, in a longitudinal recording/reproducing apparatus, it is necessary to accurately guide the tape across the bank of heads, so that the heads are precisely aligned with the individual information tracks. If the heads are out of alignment during reproduction, information reproduced may be degraded or incorrect. In helical scan magnetic tape recording/reproducing apparatus, the tape must be accurately guided around the rotary head scanner at a precise helical angle. In this way, the magnetic heads sweep slant tracks on magnetic tape at the same angle at which they were recorded. If the tape should be guided around the rotary head scanner at an angle which deviates from the track angle, the head will reproduce information from adjacent tracks, resulting in information degradation and loss.

One technique for accurately locating tape relative to the magnetic head or heads of a magnetic head assembly, is to guide the tape at the entry and/or exit of the magnetic head assembly by means of flanged guides or rollers, which constrain the tape to a predetermined path past the magnetic heads. In helical scan recorders, a rotary head scanner may include a fixed cylindrical lower drum having a fixed helical ledge which guides the lower edge of magnetic tape wrapped around the drum. A disadvantage of guiding tape by its edges is that the tape edge may become damaged with continued use, resulting in shorter tape life. Moreover, with the need for increased data storage in smaller and smaller spaces, the use of thinner tape increases the likehood of damage to the edges of the tape, if a tape edge guidance system is used. Thus, for example, U.S. Pat. No. 4,212,422, issued Jul. 15, 1980, Inventors Rauchfuss et al, discloses a web position controller for a web transport system which positions and aligns a moving web, havng a variable center line, to a predetermined center line, by means of a pair of flanged guide rollers which are mounted on a tiltable carriage. Although this system is disclosed to effect automatic alignment of the axis of the web with a predetermined center line of the system, the edge constraint imposed by the flanged rollers increases the likehood of damage to the web edges. U.S. Pat. No. 3,697,676, issued Oct. 10, 1972. Inventor Protas, discloses a helical scan magnetic tape recorder in which flanged guide rollers, which are located at the entry and exit of a rotary head scanner, guide the tape in a helical path around the rotary head scanner. Such guide rollers are likely to damage the tape edges with continued use of the tape.

Another technique for guiding a web is disclosed in U.S. Pat. No. 4,363,042, issued Dec. 7, 1985, Inventors Kinura et al. As disclosed therein, edge sensors disposed on either side of a stack of magnetic heads, in a longitudinal magnetic tape recorder, develop tape displacement error signals. These error signals actuate a servo motor which pivots a tape guiding post in a vertical direction to realign the tape with the magnetic heads. The post is pivotable about an axis which is offset from the center line of the magnetic tape. Thus, as the post pivots, an unequal tensile force is applied to the tape to slide the tape over the post. This arrangment is disadvantageous because of the lateral stresses introduced in the tape and because of wear to the tape produced by the sliding action.

U.S. Pat. No. 3,789,974, issued Jan. 22, 1974, Inventor Kron, discloses a web edge guide system including a web edge sensor which senses deviations from a normal web edge position. Any deviation generates a correction signal, which causes a servo drive system to axially move a web supply roll in a direction to return the web to its normal position. U.S. Pat. No. 4,291,825, issued Sept. 29, 1981, Inventor Glanz, discloses a web guiding system including web edge sensors and a pair of guide rollers upstream of the web sensors. The guide rollers are mounted on a frame which is tiltable to tilt the web in the plane of the web between the two rollers. The edge sensors produce error signals which control a linear motor which tilts the frame to bring the web back to its predetermined edge position. The web guiding techniques disclosed in these two patents are disadvantageous because they are only usable when the web is moved in a single direction. They also introduce stresses into the web during the web correcting operation.

Another technique which minimizes stresses on the web during correction of web edge position, is disclosed in the following patents: U.S. Pat. No. 4,453,659, issued Jun. 12, 1984, Inventor Torpey; U.S. Pat. No. 3,326,435 issued Jun. 20, 1967, Inventor Shelton; and U.S. Pat. No. 2,940,752, issued Jun. 14, 1960, Inventor Deeken. As disclosed in these patents the edge of a web (such as magnetic tape) is maintained in a predetermined position, by sensing the deviation of the web from the predetermined position, and by causing a guide roller or rollers, upstream of the sensed edge position, to pivot about the center line of a span of the web which is tangential to the guide roller. This system avoids damage to the edges of the web caused by edge-guiding arrangements and also minimizes stresses and damage to the web caused by arrangments which cause sliding of the web during its transport over a guide roller or support. However, the technique disclosed in these patents is not disclosed to be adaptable to bidirectional web transport where the edge of the web is to be accurately controlled at different locations along the length of the web.

U.S. Pat. No. 4,582,235 issued Apr. 15, 1986, Inventor Schulz, discloses a tape tracking system for magnetic tape recorders which is operable in either direction of tape movement to maintain the tape along a predetermined track. The system includes a plurality of cylindrical guide rollers which are adjustable in height and which are tiltable. Each guide roller is independently actuated by a pair of linear actuator motors which are controlled by an edge sensor. Although this system eliminates the problems of edge guide systems and utilizes edgeless cylindrical rollers, the system is complex and expensive because of the use of a pair of actuator motors for each cylindrical roller.

SUMMARY OF THE INVENTION

According to the present invention, there is provided a bidirectional web guiding system which obviates the disadvantages of the aforementioned web guiding systems. The web guiding system according to the present invention eliminates edge contact, thus minimizing web edge damage, increasing web life and improving inforamtion transferrence to and from web, such as magnetic tape. According to an aspect of the present invention, a bidirectional web guiding system is provided, including a plurality of edgeless cylindrical guide rollers for guiding magnetic tape in a path between first and second reels past a magnetic head assembly. The guide rollers are mounted on pivotally connected members which are pivoted about a pivotal axis coinciding with the center line of spans of web. Edge sensors produce error sginals which cause drive means to reposition the web to a predetermined position.

BRIEF DESCRIPTION OF THE DRAWINGS

In the detailed description of a preferred embodiment of the invention presented below, reference is made to the accompanying drawings in which like elements are numbered with like numbers.

DESCRIPTION OF THE PREFERRED EMBODIMENTS

In the following description, preferred embodiments of the present invention will be described with respect to magnet tape recording/reproducing apparatus. It will be understood, however, that the present invention is more generally applicable to any type of web utilization apparatus, where a web is guided along a path and it is desirable to maintain an edge of the web at predetermined positions along the length of the path. In magnet tape recording/reproducing apparatus, it is desirable that the tape be accurately positioned at the entrance and exit of a magnetic head assembly (either stationary or rotary) and at the entrance to a take-up reel. It is also desirable that the tape guiding system be effective in positioning the tape regardless of the direction of movement of the tape. As described below, the bidirectional tape guiding system of the present invention effects accurate positioning of magnetic tape without the use of crowned or flanged rollers or members which contact an edge of the tape.

Figure 1:
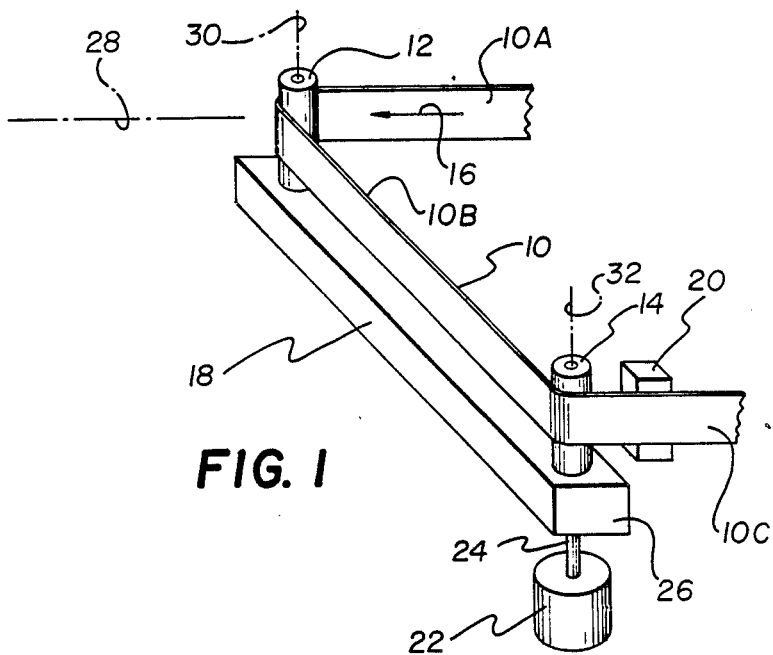
FIG. 1 is a perspective view illustrating a simple web guiding arrangement.

Referring to FIG. 1, there will be described the basic concept of a tape guiding system. As shown, magnetic tape 10 is guided in the direction of arrow 16 about cylindrical, flangeless rollers 12 and 14. Rollers 12 and 14 are rotatably mounted on member 18. Optical sensor 20 measures the position of the edge of tape 10 as it leaves roller 14. A linear servo motor 22 has an arm 24 which raises or lowers the end 26 of frame 18, in response to error signals produced by sensor 20, when the position of the edge of tape 10 deviates from a predetermined position. Frame 18 is rotatably mounted about an axis 28 which coincides with the cener line of span 10A of tape 10.

In operation, tape 10 entering cylindrical roller 12 establishes a height position such that the entering tape is perpendicular to the axis of rotation 30 of roller 12. Tape 10 follows the peripheral surface of roller 12 through the wrap angle and exits towards roller 14. At roller 14, tape 10 establishes a height position, such that, the entering tape of span 10B is perpendicular to the axis of rotation 32 of roller 14, follows the peripheral surface of roller 14 through the wrap angle and exits past the edge position sensor 20. Because of variations in tape edge position due to tape shape and source height (for example, a magnetic tape reel), the tape height wanders. Thus, the tape edge position at sensor 20 varies. Sensor 20 produces an error signal representative of any deviation of the edge of tape 10 from its predetermined position at sensor 20. This error signal is amplified and applied to servo motor 22 to raise or lower frame 18 and, consequently, roller 14, to bring the edge of tape 10 to the predetermined position. This motion of end 26 effects rotation of the steering frame about pivot axis 28. As a result, the input span 10A of tape 10 is twisted about its center line through a very small angle in order to move the edge of the tape at sensor 20. In this way, the edge of tape 10 is controlled without any frictional sliding contact between tape 10 and guide rollers 12 and 14, and without contacting the edge of tape 10 with a flange or member which might damage it.

Figure 2:
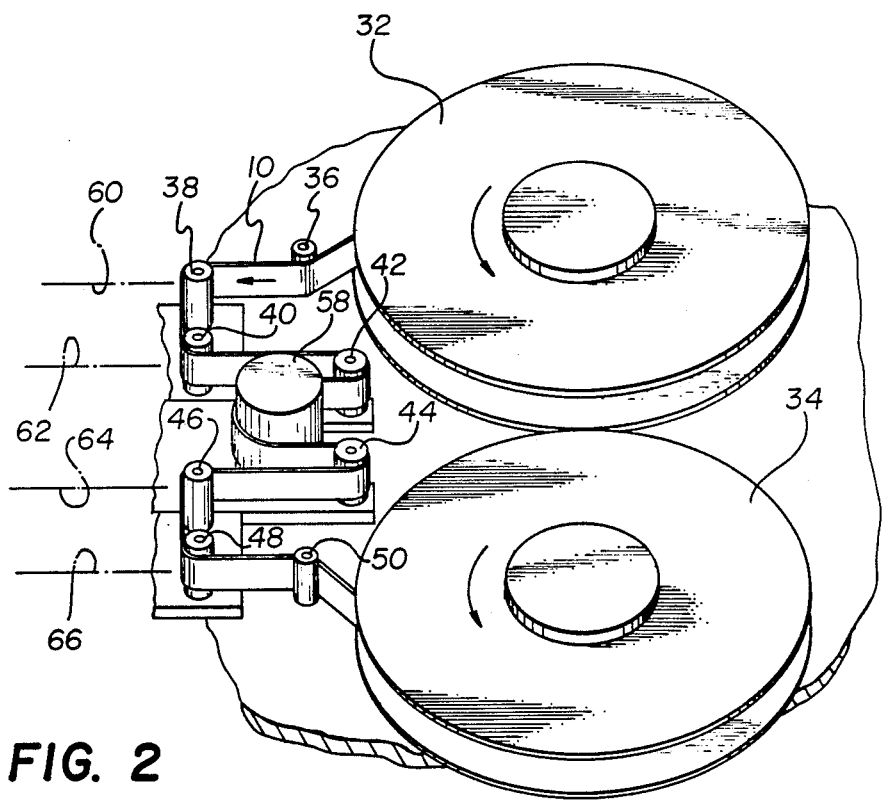
FIG. 2 is a perspective diagrammatic view of an embodiment of the present invention.
Figure 3:
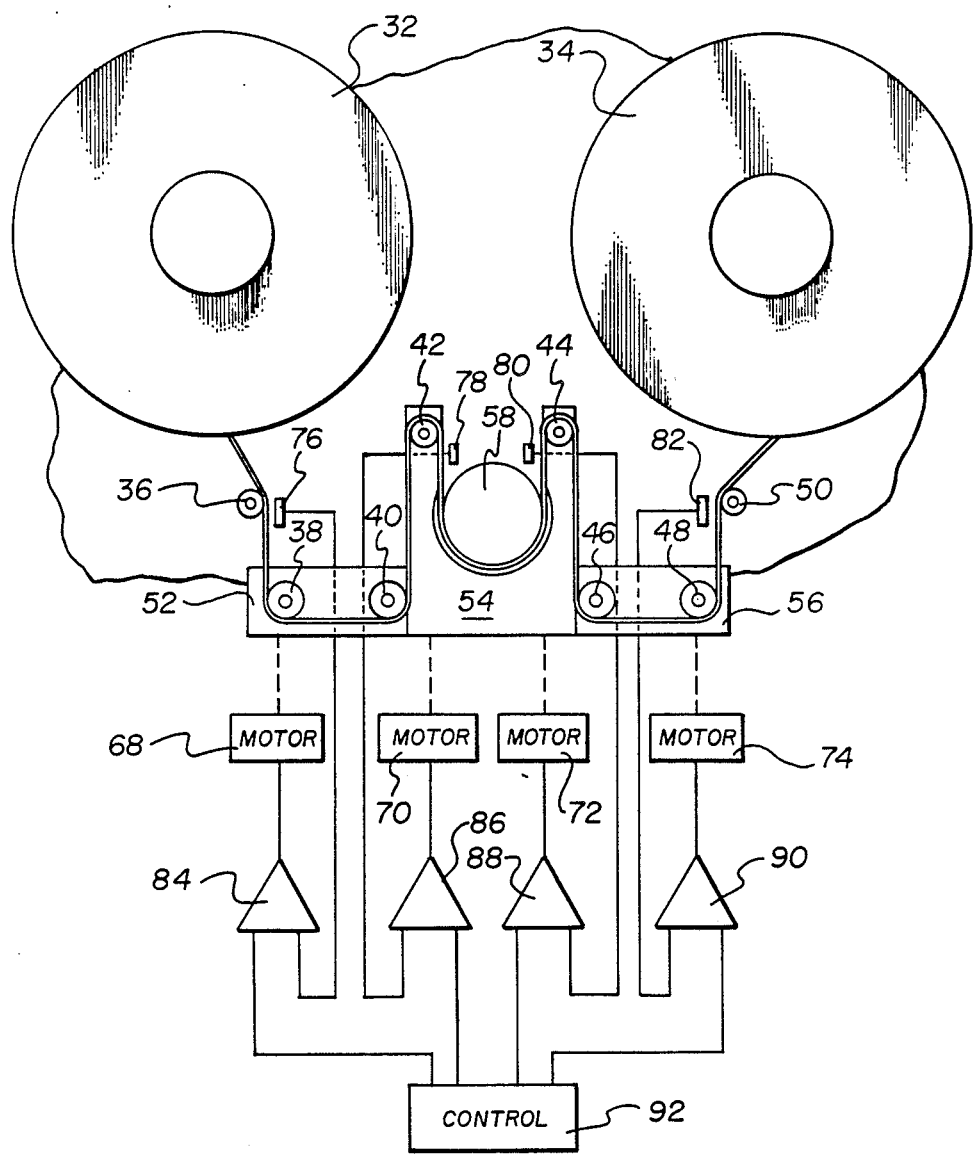
FIG. 3 is a partial block diagram, partial top plan view of the embodiment of FIG. 2.
Figure 4:
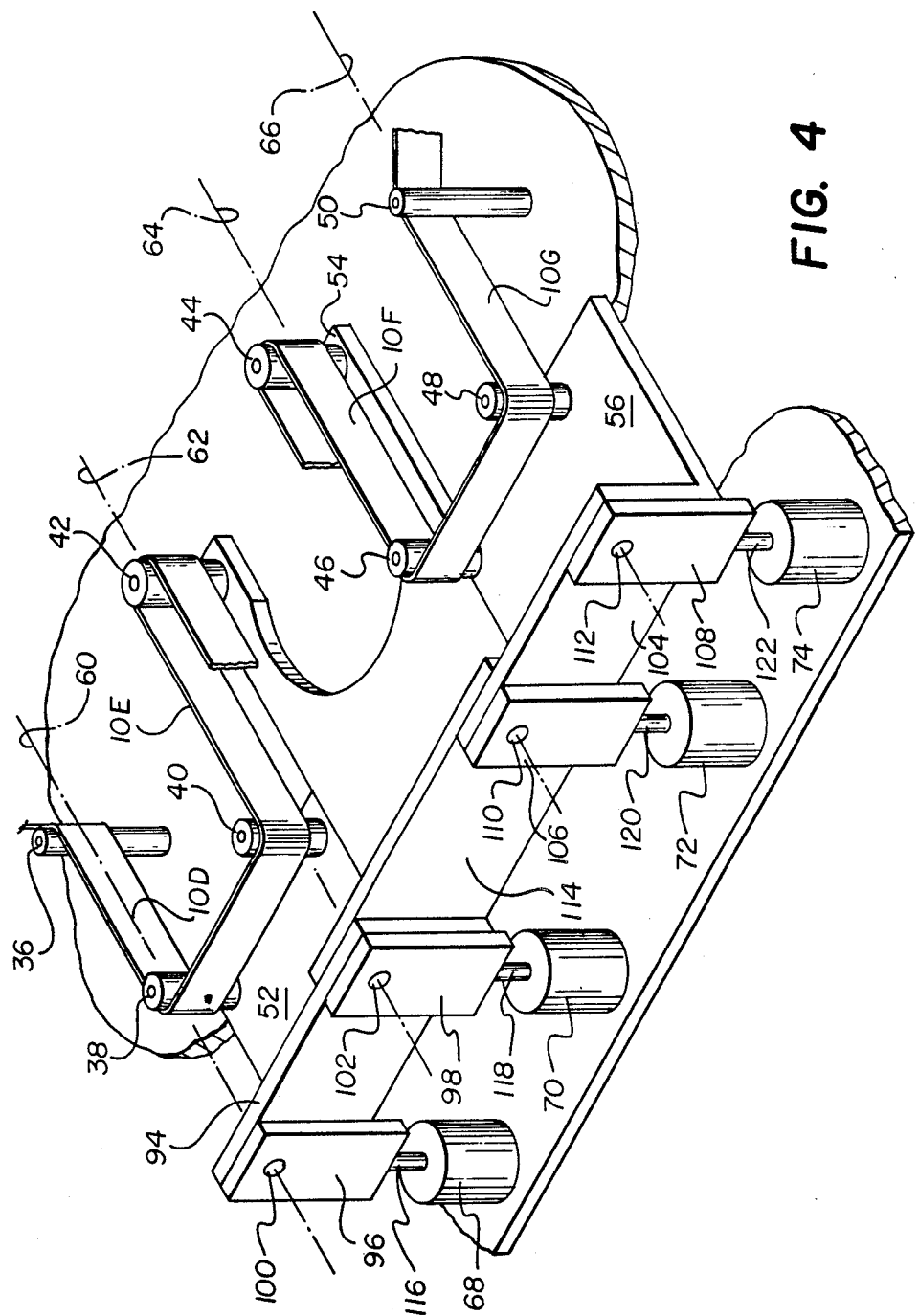
FIG. 4 is a perspective view showing components of the embodiment of FIGS. 2 and 3.

Referring now to FIGS. 2, 3 and 4, there will be described a preferred embodiment of the present invention. As shown, a magnetic tape recording/reproducing apparatus includes first and second magnet tape reels 32 and 34 for supplying and taking up magnetic tape 10. A magnetic tape transport path is defined by cylindrical flangeless rollers 36, 38, 40, 42, 44, 46, 48 and 50. Rollers 38 and 40 are mounted on member 52. Rollers 42 and 44 are mounted on member 54 and rollers 46 and 48 are mounted on member 56. Rollers 38, 40, 42, 44, 46 and 48 have rotational axes which are fixed. The rotational axes of guide rollers 38 and 40 are parallel to each other. The rotational axes of cylindrical rollers 42 and 44 are parallel to each other, and the rotational axes of cylindrical rollers 46 and 48 are also parallel to each other.

When the tape tracking servo of the present invention is inoperative, magnetic tape 10 is normally supplied from reel 32 past cylindrical guide 36 around cylindrical rollers 38, 40 and 42 about rotary head scanner 58, about cylindrical rollers 44, 46 and 48, past cylindrical guide 50 and taken up on take-up reel 34. Magnetic tape 10 may also be transported, in the opposite direction, from reel 34 to reel 32, past rotary head scanner 58.

In the embodiment shown in FIGS. 2, 3 and 4, there are four pivotal axes 60, 62, 64 and 66 which are coincident with the center lines, respectively, of tape spans 10D, 10E, 10F and 10G (FIG. 4). Tape span 10D extends between guide post 36 and cylindrical roller 38. Tape span 10E extends between guide rollers 40 and 42. Tape span 10F extends between cylindrical guide rollers 44 and 46, and tape span 10G extends between guide rollers 48 and 50. The web guiding system of the present invention includes linear servo motors 68, 70, 72 and 74 and edge sensors 76, 78, 80 and 82 (FIG. 3). Motors 68, 70, 72 and 74 are controlled by amplifiers 84, 86, 88 and 90, respectively (FIG. 3). Control circuit 92 supplies tape height position control signals to amplifiers 84, 86, 88 and 90, which also receive respective height error signals from sensors 76, 78, 80 and 82.

Member 52 includes a member 94 which is pivotally mounted on support members 96 and 98 by means of pivot pins 100 and 102. Similarly, member 56 has a member 104 which is pivotally mounted on support members 106 and 108 by pivot pins 110 and 112. Member 54 has a member 114 which is pivotally connected to both members 52 and 56 by means of pivot pins 102 and 110. Pivotal axes 60, 62, 64, 66, respectively, coincide with the pivotally axes of pivot pins 100, 102, 104, 106.

Servo motors 68, 70, 72 and 74 include respective motor shafts 116, 118, 120 and 122, which are respectively connected to support members 96, 98, 106 and 108.

Operation of the system of the invention shown in FIGS. 2, 3 and 4 is as follows. When reel 32 is a supply reel and reel 34 is a take-up reel, tape 10 will pass around guide post 36 and cylindrical rollers 38, 40 and 42 before it passes around rotary scanner 58. Tape edge sensor 78 senses the tape edge position at the entrance of tape 10 to scanner 58. If sensor 78 senses an error from the predetermined tape position, a position error signal is produced by sensor 78 and applied to motor 70 through amplifier 86. Motor shaft 118 raises or lowers member 98, to move cylindrical roller 40 up or down, to bring the edge of the tape at sensor 78 to the predetermined position. Movement of roller 40 up or down pivots the tape around pivotal axis 60. Thus, the positioning of the tape edge is effected without sliding contact between tape 10 and rollers 38, 40 and 42, and without engagement of the tape edge with an edge guide member. Thus, damage to the tape is avoided during the edge position correction operation.

As tape 10 continues around scanner 58 and cylindrical guide rollers 44 and 46, tape edge sensor 80 senses whether the position of the tape edge at the exit of scanner 58 is at its predetermined position. If there is an error in position, sensor 80 produces an error signal which is applied to motor 72, by means of amplifier 88, to cause motor shaft 120 to raise or lower member 106. Thus, member 54 pivots about pivot pin 102 and pivotal axis 62. Thus, the tape edge at sensor 80 is moved to its predetermined position by pivoting tape 10 around tape span 10E without touching the edge of the tape and without sliding contact of the tape with rollers 44, 42 and 46.

As the tape continues to pass around rollers 46, 48 and 50, edge sensor 82 senses the position of the edge of tape 10 at the entrance to reel 34. If sensor 82 senses an error in tape edge position, it produces an error signal which is applied to motor 74 through amplifier 90. Motor shaft 122 of motor 74 raises or lowers support member 108 to pivot steering member 56 about pivot pin 110. This effects pivoting of the magnetic tape about pivotal axis 64 of tape span 10F. The magnetic tape is now properly positioned at both the entrance and exit to rotary head scanner 58 and at the entrance to magnetic tape reel 34. Tape 10 properly tracks past the magnetic heads of scanner 58 and is wound onto reel 34 at the proper tape edge height.

According to the present invention, the tape tracking system is operable in either direction. Thus, if tape 10 is supplied from reel 34 and taken up by reel 32, tape edge sensors 80, 78 and 76 effects tape edge correction, respectively, at the entrance and exit of scanner 58 and at the entrance to reel 32. Any edge position error sensed by sensor 80 causes motor 72 to pivot member 56 about pivot pin 112 and pivotal axis 66 to bring the edge of the tape to its predetermined position. Any tape edge position error sensed by sensor 78, causes motor 70 to pivot member 54 about pivot pin 110 and pivotal axis 64 to bring the tape edge at sensor 78 to its predetermined position. Similarly, any tape edge position error sensed by sensor 78, causes motor 68 to pivot member 52 about pivot pin 102 and tape pivotal axis 62 to bring the edge of the tape at span 10D to it predetermined position.

Figure 5:
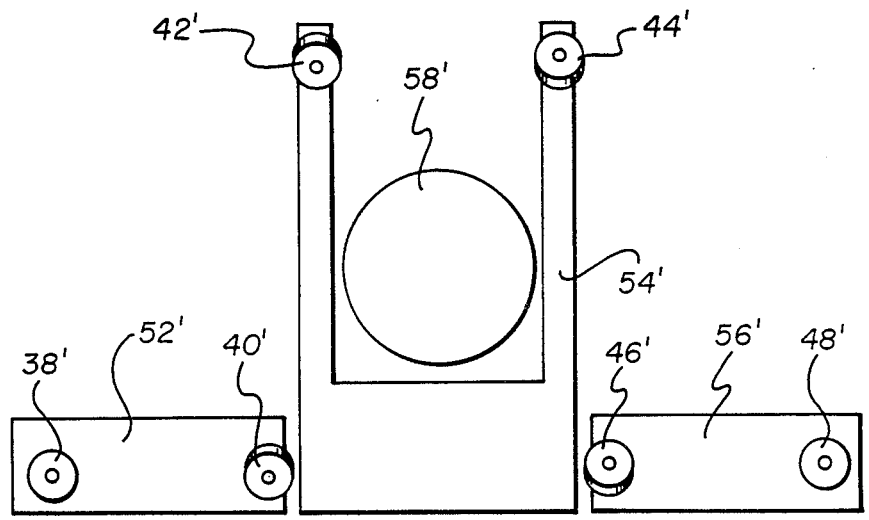
FIGS. 5 and 6 are respective top plan and elevational views of another embodiment of the present invention.
Figure 6:
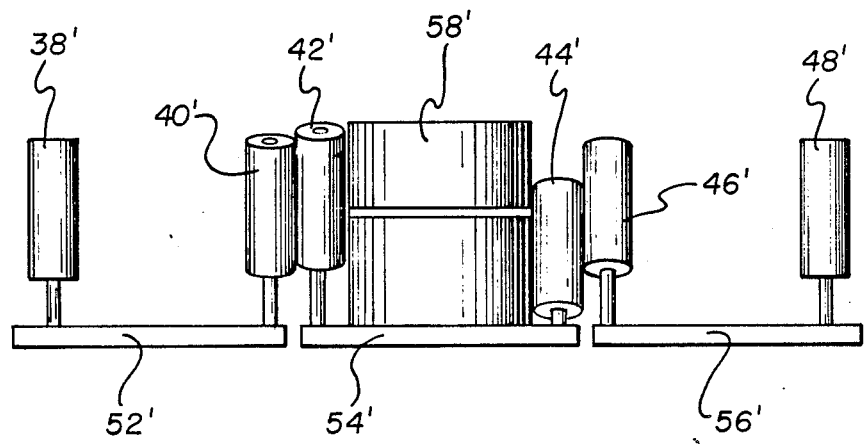

Referring now to FIGS. 5 and 6, there is shown another embodiment of the present invention. In the embodiment of FIGS. 2, 3 and 4, magnetic tape 10 is guided past rotary head scanner 58 in a longitudinal direction. Thus, the heads of rotary head scanner are tilted at an angle in order to record and reproduce slant tracks on tape 10. In the embodiment shown in FIGS. 5 and 6, which is substantially similar to the embodiment shown in FIGS. 2, 3, and 4, rotary head scanner 58' is substantially vertically oriented. Magnetic tape 10 is guided around rotary head scanner 58' in a helical path. This path is effected by tilting guide rollers 40' and 42' in a forward direction and tilting guide rollers 44' and 46' in a rearward direction. Moreover, the heights of rollers 42' and 44' are varied from the heights of rollers 38', 40', 46' and 48' in order to effect downward and upward slopes to the tape spans between roolers 40' and 42' and 44' and 46', respectively. Moreover, the pivotal axes of these spans is tilted with respect to the pivotal axes of the spans about rollers 38' and 48'. The embodiment of the invention of FIGS. 5 and 6 otherwise operates in the same manner as the embodiment of the invention of FGIS. 2, 3 and 4. For this reason, the servo motors and sensors are not shown in the embodiment of FIGS. 5 and 6.

Although the invention has been described in detail with particular reference to preferred embodiments thereof, it will be understood that variations and modifications can be effected within the spirit and scope of the invention as described hereinabove and as defined in the appended claims.

What is claimed is:

1. A web guiding system comprising:
   first and second members;
   first flangeless cylindrical roller means and second flangeless cylindrical roller means respectively mounted on said first and second members for guiding a web along first, second and third web spans in respective first, second and third substantially parallel planes; wherein said web has longitudinal edges and a center line running longitudinally between said edges;
   first mounting means for pivotally mounting said first member about a first pivotal axis which substantially coincides with the center line of said first web span;
   second mounting means for pivotally mounting said first and second members together about a second pivotal axis which substantially coincides with the center line of said second web span;
   sensor means for sensing the edge of said web at respective positions substantially near said second web span, and substantially near said third web span; and drive means, coupled to said first and second members, for pivoting said first member about said first pivotal axis, when said sensor means detects an error in position of the edge of said web from a first predetermined position substantially near said second web span, to return said web edge to said first predetermined position by pivoting said second web span about said first pivotal axis; and for pivoting said second member about said second pivotal axis, when said sensor means detects an error in the position of the edge of said web from a second predetermined position substantially near said third web span to return said web edge to said second predetermined position by pivoting said third web span about said second pivotal axis.

2. The system of claim 1 including third mounting means for pivotally mounting said second member about a third pivotal axis coincident with the center line of said third web span, and wherein said sensor means senses the position of the edge of said web substantially near said first web span, such that, when said web is transported in a direction from said third web span to said first web span, said drive means pivots said second member around said third pivotal axis, when said sensor means detects an error in the position of the edge of said web from a predetermined position substantially near said second web span, to return said web edge to said predetermined position by pivoting said second web span about said third pivotal axis; and said drive means pivots said first member about said second pivotal axis, when said sensor means detects an error in the position of the edge of said web from a predetermined position substantially near said first web span to return said web edge to said predetermined position by pivoting said first web span about said second pivotal axis.

3. A system for guiding magnetic tape along a tape path through a magnetic recording/reproducing apparatus, said system comprising:
first and second mnembers, first flangeless cylindrical guide roller means mounted on said first member, second cylindrical guide roller means mounted on said second member, said first and second guide roller means guiding said magnetic tape along a path having first, second and third tape spans in respective first, second and third susbstantially parallel planes; wherein said web has longitudinal edges and a center line running longitudinally between said edges;
first mounting means for pivotally mounting said first member about a first pivotal axis which substantially coincides with the center line of said first tape span;
second mounting means for pivotally mounting said first and second members together and about a second pivotal axis substantially coincident with the center line of said second tape span;
third mounting means for pivotally mounting said second member about a third pivotal axis substantially coincident with the center line of said third tape span;
sensor means for sensing an edge of said tape at respective locations substantially near said first, second and third tape spans; and
drive means linked to said first and second members for operation, in a first mode, when said magnetic tape moves in a first direction from said first tape span to said third tape span, for pivoting said first member about said first pivotal axis, when said sensor means senses an error in the position of an edge of said tape from a predetermined position substantially near said second tape span, to return said tape edge to said predetermined position by pivoting said second tape span about said first pivotal axis; and for pivoting said second member about said second pivotal axis, when said sensor means detects an error in the position of an edge of said tape from a predetermined position substantially near said third tape span, to return said tape edge to said predetermined position by pivoting said third tape span about said second pivotal axis; and, in a second mode, when said tape moves in a direction from said third tape span to said first tape span, for pivoting said second member about said third pivotal axis, when said sensor means detects an error in the position of an edge of said tape from a predetermined position substantially near said second tape span, to return said tape edge to said predetermined position by pivoting said second tape span about said third pivotal axis; and for pivoting said first member about said second pivotal axis, when said sensor means detects an error in the position of an edge of said tape from a predetermined position substantially near said first tape span to return said tape edge to said predetermined position by pivoting said first tape span about said second pivotal axis.

4. The system of claim 3 including a third member and third flangeless cylindrical guide roller means mounted on said third member, for guiding said magnetic tape along a fourth tape span in a plane substantially parallel to said planes of first, second and third tape spans, and including fourth mounting means for pivotally mounting said third member about a fourth pivotal axis coincident with the center line of said fourth tape span and wherein said third mounting means pivotally mounts said third and second members together.

5. The system of claim 3 including a rotary magnetic head scanner located between said second and third tape spans and wherein said first and second guide roller means tilt said second and third tape spans in opposite directions so that said magnetic tape is guided around said rotary magnetic head scanner in a helical path.

* * * * *